Figure 1:
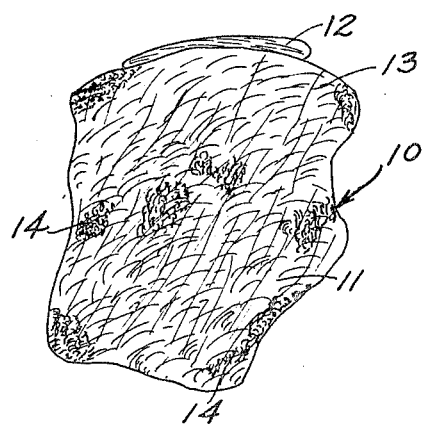

Aug. 30, 1966 O. G. ARTAR ET AL 3,270,041
LOW-TEMPERATURE RENDERING OF ANIMAL FATTY TISSUE
Filed March 7, 1963

INVENTORS
ORHAN G. ARTAR
CHESTER J. FILIPOWICZ
JOSEPH C. WILCOX
BY Carl C Batz
ATTY.

United States Patent Office
3,270,041
Patented August 30, 1966

3,270,041
LOW-TEMPERATURE RENDERING OF ANIMAL FATTY TISSUE
Orhan G. Artar, Chicago, Chester J. Filipowicz, Lockport, and Joseph C. Wilcox, Park Forest, Ill., assignors to Armour and Company, Chicago, Ill., a corporation of Delaware
Filed Mar. 7, 1963, Ser. No. 263,556
1 Claim. (Cl. 260—412.6)

This invention relates to a low-temperature rendering process for recovering a substantially protein-free fat portion and a highly stable protein-rich fat portion from animal fatty tissue.

Although the meat packing industry is known to be highly efficient in finding uses for most, if not all parts of a slaughtered animal, it is continually striving to find more valuable uses for each part of the animal. For example, the least valuable portions of the slaughtered animal are generally rendered at high temperatures and so any time a portion which is normally rendered is found to be more valuable in other areas, the packer is rewarded with substantial savings.

Specifically, in recovering edible fats from animal trimmings, the packer has been able to recover a fairly pure fat product, but the protein portion of the trimmings have not been suitable for human consumption since excessive rendering temperatures denature the protein. For instance, certain meat trimmings, such as belly strips and bootjacks, usually contain some trimmable lean which is edible and could be used as a component in a sausage formulation. Furthermore, material that appears to be pure fat contains a substantial amount of proteinaceous connective tissue which would normally be edible. However, due to the high temperatures normally used in rendering operations, the protein material becomes unsuitable for use in sausage.

Although in recent years, the industry has recognized the value of recovering all proteinaceous material from fat trimmings at relatively low temperatures, the products resulting from the processes have not been satisfactory due to rather poor and inconsistent stability. Clearly, it would be highly advantageous if it would be possible to recover a highly stable protein material from animal tissue so that the proteinaceous material could be stored for relatively long periods of time without adverse effects and still be used in formulating sausage.

It is therefore a primary object of this invention to provide a low-temperature rendering process for recovering highly stable protein-rich fat and substantially protein-free fat from animal tissue.

It is also an object of this invention to provide a process for recovering a protein-rich fat material which is suitable for use in a sausage formulation.

It is a further object of this invention to provide a process for recovering a highly stable protein-rich fat material which may be stored for relatively long periods of time.

It is another object of this invention to provide a process for rendering animal tissue at a temperature below 100° F.

It is still a further object of this invention to provide a low-temperature rendering process for recovering a substantially protein-free edible fat fraction from animal fatty tissue.

Further purposes and objects of this invention will appear as the specification proceeds.

Figure 3:
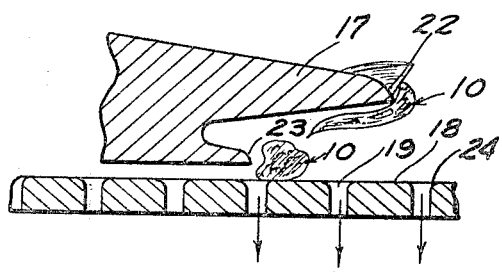
Figure 2:
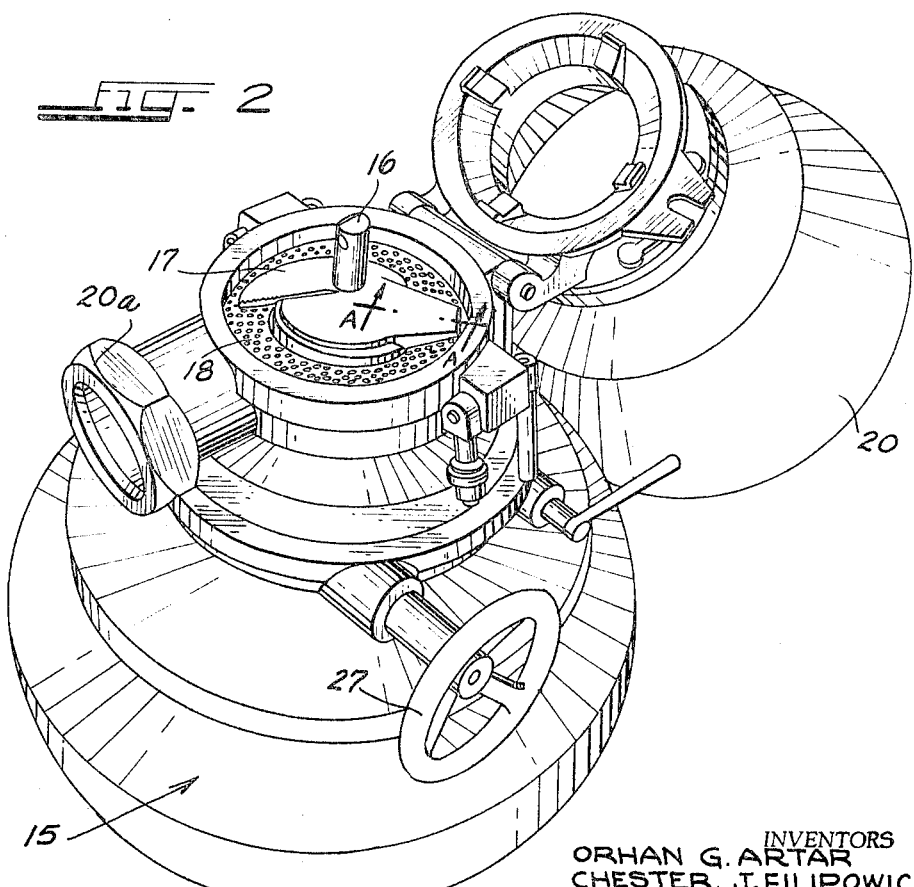

Referring to the accompanying drawings:
FIG. 1 is a simplified illustration, greatly enlarged, of animal fatty tissue;
FIG. 2 is a perspective view of apparatus useful for dislocating fat from the proteinaceous material; and
FIG. 3 is an enlarged detail view, in section, along line A—A as shown on FIG. 2, of the fat dislocating area of the apparatus of FIG. 2.

We have now discovered a low-temperature rendering process for recovering substantially protein-free fat and highly stable protein-rich fat from animal tissue. Generally, this process includes the steps of reducing the particle size of the tissue, mechanically dislocating the fat from the proteinaceous material, and mechanically separating the protein-rich fat from the substantially protein-free fat by centrifugation while maintaining the temperature preferably below 100° F.

Although the present process is useful in connection with many types of animal tissue, including beef, sheep, lamb etc., the most important use of the process is with pork. More specifically, pork fatty tissue which may readily be used in connection with the process are belly strips, belly trimmings, jowls, bellies, picnics, killing fats such as leaf fat and caul fat, and cutting fats such as clear fat backs, loin fat, ham fat etc. The description of the invention which follows will be made in connection with pork tissue specifically, but it should be kept in mind that the same applies also to other animal tissue, except that in the latter cases the applicable temperatures will generally be on the order of 10–12° F. higher than in the case of pork tissue.

The first step of the process, that is, the reduction of the particle size of the tissue, may be accomplished by a number of different methods, such as grinding, chopping, mincing etc. The primary purpose of this step is to provide a pumpable or flowable mass for a continuous process. The employment of a continuous grinder in this step has been found to be particularly satisfactory. Although one-inch diameter holes in the grinder plate have been found to be highly advantageous, generally the diameter of the grinder plate openings may range from about one-eighth of an inch up to the largest openings available in grinder plates.

Following the reduction of the particle size, the tissue is ordinarily directed to a mixing tank. Since, depending upon the temperature of the material after grinding, heat may or may not be applied to the mixing tank, a steam-jacketed mixing tank is usually used. Desirably, the temperature of the material following the grinding step is between about 65° and 80° F. A preferred range is from 73° to 78° F. and the optimum temperature is about 75° F. Since killing fats are ground at the approximate body temperature of the animal, that is, about 102° F. to 104° F., this warm fat may be blended with the cool cutting fats which are at a temperature of about 45° to 55° F. so that the desired temperature is attained. The heated animal tissue is removed from the steam-jacketed tank and directed to the apparatus wherein the fat is dislocated from the proteinaceous connective tissue and/or the trimmable lean meat.

The mechanical defatting or dislocating of fat from the proteinaceous material may be more clearly understood by referring to FIGS. 1 through 3. As shown in FIG. 1, a greatly enlarged portion of meat 10 includes pure fatty tissue 11, which is white in appearance, and pure lean meat 12, which is red in appearance. The fatty portion 11 is comprised of a large number of fat cells 14, which are supported in a matrix of proteinaceous tissue 13. Furthermore, the lean portion 12 and the proteinaceous material 13 contain a substantial quantity of bound water.

In separating the fat contained in the fat cells 14 from the poteinaceous membranes of the cells and from the connective tissue 13, it is desirable that the proteinaceous tissue be maintained as large as possible since the larger the protein matter, the less is the adverse effect of heat on the protein. Therefore, a preferred method for dislocating fat from protein is by abrading the tissue in order to rupture the fat cells, with a minimum amount of cutting of proteinaceous matter. Furthermore, it is desirable that the protein be mechanically separated from the fat at relatively low temperatures, preferably no higher than about 85° F.

Referring to FIGS. 2 and 3, there is illustrated apparatus 15 which is useful for the mechanical dislocation step. In the apparatus illustrated, the incoming temperature of material is to be sufficiently high to be flowable through the apparatus 15 and yet the temperature is not to be raised to the extent that the material becomes very flowable. Hence, the incoming material is desirably maintained in the range of 65° to 80° F. Generally, apparatus 15 is of well-known construction but contains modified parts in order to provide the desired abrading action. The shaft 16 rotates the blade 17 at a relatively high rate of speed, usually about 1800 r.p.m. Adjacent the blade 17 is the plate 18 which has a plurality of openings 19.

The warm ground material is fed into the hopper 20 shown rotated out of normal position. The meat 10 or fatty tissue 11 is picked up by the blade 17, is forced through the openings 19 by the blade 17, and then discharged through the outlet 20a.

Preferably, portions 22 and 23 of the blade 17 are blunt so that any cutting of protein is minimized. Also, the openings 19 in plate 18 are chamfered or rounded 24 at the side nearest the blade 17. Therefore, since the portion 23 is blunt and since the openings 19 are rounded 24, the material undergoes the desired abrading action. Preferably, the diameter of openings 19 range from about 1 mm. to 16 mm. Optimally, the diameter is about 5 mm.

In passing through the apparatus 15, the material usually rises in temperature due to friction. At the optimum, the temperature is raised from about 5° to 6° F., but advantageously the temperature increase is from about 3° to 10° F. Preferably, the material passing from the apparatus 15 is at a temperature of about 79° to 85° F., and optimally at a temperature of about 81° F. The temperature rise is significant since too low a temperature increase indicates that the material is passing through the apparatus 15 too quickly and is not being properly worked or abraded and too great a temperature rise indicates excessive friction and overworking of material. In order to maintain the desired temperature increase, the blade 17 may be adjusted toward or away from the plate 18 and this may be accomplished by turning a crank 27 on the side of the apparatus 15.

Preferably, after the dislocation step, the proteinaceous matter is mechanically separated from the fat by centrifugation. However, the temperature of the mass of fat, protein and largely bound water is raised to a temperature of about 92° to 100° F. to decrease the viscosity thereof, so that the fatty medium is sufficiently fluid to allow the suspended proteinaceous particles to move freely therethrough and be separated therefrom. Therefore, since the mass passing from the apparatus 15 is at a temperature of less than about 85° F., the temperature is raised to about 92° to 100° F., preferably to about 92° to 98° F., in a suitable means, such as a steam-jacketed heating tank.

After heating, the material is mechanically separated, preferably in a centrifuge. The type of centrifuge described in U.S. patent application Serial No. 14,656, now abandoned, is preferably used since a quiescent zone of centrifugation is provided. The quiescent zone has been found to provide a very sharp separation since there is no agitation of the fluid mass.

Generally, the residual protein-rich fraction is a mixture of free protein with bound water, free fat, and some fat in unbroken cells. The effluent of substantially protein-free fat generally contains free fat, some fat in unbroken cells, and a very small amount of water and free protein with bound water. The protein-rich residual is used in edible products such as frankfurters, bologna, meat loaves, canned meats, etc., and depending upon the starting material, the residual is used in "all meat" frankfurters and bologna and canned meats, etc.

From the above, it is seen that the present invention provides a low temperature rendering process for recovering a substantially protein-free fat fraction and a substantially protein-rich fat fraction from a mixture of animal fatty tissue while the temperature is preferably maintained below 100° F. Since the protein need not be heated to a temperature in excess of 100° F. at any time during the process, the storage life of the protein-rich product is greatly increased. This is believed to be due to the fact that the rate of oxidation of unsaturated fats is increased as the temperature increases. Therefore, by maintaining the temperature as low as possible, the rate of oxidation is reduced so that there is a resulting significant increase in the storage life of the protein-rich fraction. It is of course possible to bring the temperature somewhat over 100° F. and still obtain improved benefits over conventional processes, but since it is not necessary in the present process to operate at higher temperatures and since the stability of the product progressively deteriorates as the temperature proceeds above 100° F., it is preferred to operate in the 92–100° F. range.

A further feature of the invention is that the process is adaptable to operation as a closed system under vacuum, which has an additional favorable effect on the storage life of the end product. The vacuum may be applied at any point in the process, but preferably just prior to or just subsequent to the centrifugation step.

The following examples specifically illustrate the present process:

EXAMPLE I 3,650 lbs. of pork belly trimmings and 2,375 lbs. of shoulder ends of back fat were ground through a grinder equipped with a plate having openings of one-inch in diameter. Ground materials were collected in a steam-jacketed tank equipped with agitators and heat was applied to bring the temperature of materials (58° F.) to 75° F. The materials were then passed through a Mincemaster equipped and adjusted so as to obtain the desired type and degree of comminution. The temperature of materials coming out of the Mincemaster was 78° to 80° F. Comminuted materials were collected in a steam-jacketed tank equipped with agitators and heat was applied to bring the temperature of materials to 98° F.

At this temperature, materials were in a fluid form. This fluid material was pumped to a centrifuge where it was separated into a protein-rich and fat-rich fraction. The fat-rich fraction was continuously discharged from the centrifuge for subsequent processing into high quality prime steam lard. The protein-rich fraction (partially defatted chopped pork) was collected in the centrifuge bowl. When the bowl was filled with the protein-rich fraction, feed to centrifuge was cut off and contents of bowl was emptied into a product-holding kettle where it was mixed and pumped to a quick-chilling unit to bring the temperature from 98° F. to 32° to 40° F. Chilled product was packaged in boxes and placed in freezer storage. One filling of the bowl, which consumed approximately 2,000 lbs. of feed, produced 650 lbs. of partially defatted chopped pork.

The product was used at 15, 25, and 35% levels as a direct substitute for fresh regular pork trimmings in a conventional frankfurter formula. The resulting frankfurters had an excellent appearance, taste, texture, and color.

EXAMPLE II 4,800 lbs. of pork belly trimmings and 2,140 lbs. of shoulder ends of back fat were ground through a one-inch plate. Ground materials were collected in a steam-jacketed tank equipped with agitators where the temperature was raised from 50° F. to 73° to 75° F. by application of heat. Materials were then passed through a Mincematser equipped and adjusted so as to obtain the desired type and degree of comminution. Finely comminuted materials (79° to 82° F.) were delivered to a second steam-jacketed tank equipped with agitators, where they were heated to 99° F. and pumped to a centrifuge for separation into a protein-rich and a fat-rich fraction. The protein-rich fraction (partially defatted chopped pork) accumulated in the centrifuge bowl while the fat-rich fraction was continuously discharged. After the bowl was filled with the protein-rich fraction, feed to centrifuge was cut off and contents of bowl was emptied into a product-holding kettle where it was mixed and pumped to a quick-chilling unit. Passage through the quick-chilling unit lowered the temperature of product to 32° to 40° F. from 99° F. Chilled product was packed in boxes and placed in freezer storage. Two more batches were manufactured in the above manner and a total of 2,050 lbs. of partially defated chopped pork was obtained which was of bright pink color and excellent quality.

EXAMPLE III

Approximately 4,200 lbs. of cutting fats (back fat, loin, fat, ham fat) and 2,000 lbs. of killing fats (leaf fat) were ground through a grinder equipped with a plate having openings of one-inch in diameter and delivered into a steam-jacketed tank, equipped with agitators. The temperature of cutting fats and killing fats was 45° F. and 102° F., respectively. Since these fats were ground as they were delivered to grinder and since the delivery rate of each type of fat was practically uniform, the composite temperature of the ground materials in the tank was within the range of 73° to 78° F. at any given time during production.

The ground materials were pumped from the tank to a Mincemaster for fine comminution. The Mincemaster was equipped and adjusted in a manner to obtain the desired type and degree of comminution. The temperature of materials coming out of the Mincemaster was within the range of 78° to 83° F. during the entire length of the operational period.

Materials discharged from the Mincemaster were collected in a surge box where they were picked up by a pump and delivered into a second steam-jacketed tank equipped with agitators. The temperature of finely comminuted materials was brought to 96° to 98° F. in this tank and then pumped to a centrifuge to effect the separation of the heavier protein-rich fraction from the lighter fluid fat-rich fraction. The protein-rich residue was collected in the bowl of the centrifuge and fluid fatty fraction was discharged through a discharge opening into a surge box where it was picked up by a pump and delivered into tanks for processing into high quality prime-steam lard. When the centrifuge bowl was filled with the protein-rich residue, the feed to centrifuge was cut off and the contents of bowl was emptied into a product-holding kettle equipped with agitators. Product was mixed in this kettle and then pumped into a quick-chilling unit which brought the temperature of product from 98° F. to 32° to 40° F. The product was collected in 50-pound boxes and placed in freezer.

600 lbs. of bright pink protein-rich material (partially defatted pork fatty tissue) was obtained from approximately 6,200 lbs. of pork fatty materials. It was used in a current bologna formula as a direct substitute for fresh regular pork trimmings, the total amount added being 15% of the total meat ingredients. The final product obtained has an excellent taste, texture and color.

EXAMPLE IV

Approximately 10,000 lbs. of back fat, 5,000 lbs. of loin fat, 2,500 lbs. of ham fat, and 12,000 lbs. of leaf fat were ground through a one-inch plate in a mixed order as they were delivered to the grinder location. The ground materials were collected in a steam-jacketed tank and pumped to and finely comminuted by a Mincemaster equipped and adjusted so as to obtain proper type and degree of comminution. The finely comminuted materials were delivered to a second tank where they were heated to 95° to 99° F. and pumped to a centrifuge where it was separated into a protein-rich and a fat-rich fraction. When a sufficient amount of protein-rich fraction (PDPFT) was collected in the centrifuge bowl, feed to centrifuge was cut off and contents of bowl was emptied into a product-holding kettle. As soon as the centrifuge bowl was emptied, feed to centrifuge was turned back on. Product in the holding kettle was pumped to a quick-chilling unit where the temperature was lowered from 95° to 99° F. to 32° to 40° F. Chilled product was packed in boxes and placed in freezer storage.

All steps of the process (i.e., grinding, mixing, fine comminution, heating, centrifugation, chilling, and packing) were performed continuously with the exception of brief interruptions of the flow of feed to centrifuge during the periods when the centrifuge bowl was emptied. When the centrifuge bowl was being emptied, the rest of the operations still continued.

The centrifuge bowl was filled and emptied four times and 2,650 lbs. of partially defatted pork fatty tissue was obtained. The product had a uniform bright pink color.

EXAMPLE V

Two different samples of the protein-rich fat fraction were processed in a manner similar to that set forth in Examples I or II, except that one sample was raised to a final temperature of 112° F. Each sample was stored in a freezer and the peroxide value of each sample was checked at certain intervals.

| Sample | Temperature, °F. | Peroxide Value After— | | |
|---|---|---|---|---|
| | | 12 Days | 21 Days | 209 Days |
| No. 1 | 98 | .1 | .1 | 26.0 |
| No. 2 | 112 | 10.4 | 25.3 | 148.0 |

Since the peroxide value, which indicates the rate of oxidation, was much greater in sample No. 2 at all times, sample No. 1 had a significantly longer storage life than sample No. 2.

While in the foregoing there has been a detailed description of the present invention, it is to be understood that there is to be no limitation of the scope of the invention by the various details set forth in the examples and in the detailed description of the invention.

We claim:

A low temperature rendering process for recovering substantially protein-free fat and highly stable protein-rich fat from animal tissue, comprising the steps of decreasing the particle size of said tissue and providing a flowable mass having a temperature between about 65 and 80° F., mechanically dislocating the fat from the proteinaceous material of said tissue by grinding said tissue between blunt surfaces to cause a temperature rise of no greater than about 10° F. and no less than about 3° F., while maintaining the temperature of said tissue between about 79 and 85° F., decreasing the viscosity of the ground mass of fat and protein by heating, and centrifuging to obtain a substantially protein-free fat fraction and a protein-rich fat fraction having improved storage life while maintaining the temperature in the range of about 92° F. to 100° F.

References Cited by the Examiner

UNITED STATES PATENTS 3,063,840   11/1962   Sullivan ........... 260—412.6
3,078,165   2/1963    Alberts ........... 260—412.6

CHARLES B. PARKER, *Primary Examiner.*

ANTON H. SUTTO, R. L. RAYMOND,
*Assistant Examiners.*